United States Patent
Bielby (10) Patent No.: US 12,043,285 B2
(45) Date of Patent: Jul. 23, 2024

(54) VEHICLES THAT CAN BE CUSTOMIZED AND PERSONALIZED VIA MOBILE USER PROFILES

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/844,278

(22) Filed: Apr. 9, 2020

(65) Prior Publication Data
US 2021/0316754 A1 Oct. 14, 2021

(51) Int. Cl.
| | |
|---|---|
| B60W 60/00 | (2020.01) |
| B60K 35/00 | (2024.01) |
| B60K 35/22 | (2024.01) |
| B60N 2/75 | (2018.01) |
| B60W 10/06 | (2006.01) |
| B60W 10/10 | (2012.01) |
| B60W 10/18 | (2012.01) |
| B60W 10/20 | (2006.01) |
| B60W 10/22 | (2006.01) |

(Continued)

(52) U.S. Cl.
CPC ......... B60W 60/0013 (2020.02); B60K 35/00 (2013.01); B60N 2/793 (2018.02); B60W 10/06 (2013.01); B60W 10/10 (2013.01); B60W 10/18 (2013.01); B60W 10/20 (2013.01); B60W 10/22 (2013.01); B62D 25/14 (2013.01); G06N 3/08 (2013.01); B60K 35/22 (2024.01)

(58) Field of Classification Search
CPC .. G06N 3/08; B60K 2370/736; H04L 67/306; B60R 16/037
See application file for complete search history.

(56) References Cited

U.S. PATENT DOCUMENTS

| | | |
|---|---|---|
| 10,214,118 B1 | 2/2019 | Jain et al. |
| 2010/0037057 A1 | 2/2010 | Shim et al. |

(Continued)

FOREIGN PATENT DOCUMENTS

| | | | |
|---|---|---|---|
| DE | 102017204424 | 9/2018 | |
| DE | 102018211835 A1 * | 12/2019 | ............... G06N 3/04 |

(Continued)

OTHER PUBLICATIONS

DE-102018211835-A1 translation obtained from PE2E search (Year: 2019).*

(Continued)

*Primary Examiner* — James J Lee
*Assistant Examiner* — David Hatch
(74) *Attorney, Agent, or Firm* — Greenberg Traurig (57) ABSTRACT

A vehicle that can be customized and personalized via a mobile user profile. The vehicle can include a body, a powertrain, vehicle electronics, and a computing system. The computing system of the vehicle can be configured to: receive data fields of a driver profile of a user from a mobile device; estimate, using machine learning, configurations of vehicle functions for the vehicle according to the data fields; and control settings of a set of components of the vehicle, via the vehicle electronics, according to the estimated configurations.

14 Claims, 5 Drawing Sheets

(51) Int. Cl.
  *B62D 25/14* (2006.01)
  *G06N 3/08* (2023.01)

(56) References Cited

U.S. PATENT DOCUMENTS

| | | | |
|---|---|---|---|
| 2010/0233957 A1 | 9/2010 | Dobosz | |
| 2011/0193522 A1 | 8/2011 | Uesugi | |
| 2014/0309866 A1* | 10/2014 | Ricci | G06Q 30/0633 |
| | | | 701/36 |
| 2014/0310594 A1* | 10/2014 | Ricci | G06F 3/0622 |
| | | | 715/702 |
| 2015/0057839 A1* | 2/2015 | Chang | B60R 16/037 |
| | | | 701/2 |
| 2016/0001720 A1 | 1/2016 | Vadgama et al. | |
| 2016/0264131 A1* | 9/2016 | Chan | A61B 5/4875 |
| 2017/0267256 A1* | 9/2017 | Minster | B60W 50/082 |
| 2019/0135303 A1 | 5/2019 | Kim et al. | |
| 2019/0199800 A1 | 6/2019 | Penilla et al. | |
| 2019/0291719 A1* | 9/2019 | Tiziani | B60W 50/085 |
| 2021/0179125 A1* | 6/2021 | Vardharajan | G05D 1/0221 |

FOREIGN PATENT DOCUMENTS

| | | | | |
|---|---|---|---|---|
| GB | 2561621 A | * | 10/2018 | G06F 9/455 |
| KR | 20190023554 | | 3/2019 | |
| WO | WO-2014120248 A1 | * | 8/2014 | B60R 16/037 |

OTHER PUBLICATIONS

Kuhnel et al, Machine Translation of DE 102017206069 A1, published Oct. 11, 2018 (Year: 2018).*
International Search Report and Written Opinion, PCT/US2021/025016, dated Jul. 2, 2021.
Extended European Search Report, EP21783747.5, mailed on Mar. 20, 2024.

* cited by examiner

VEHICLES THAT CAN BE CUSTOMIZED AND PERSONALIZED VIA MOBILE USER PROFILES

FIELD OF THE TECHNOLOGY

At least some embodiments disclosed herein relate to vehicles that can be customized and personalized via mobile user profiles.

BACKGROUND

Vehicles can include cars, trucks, boats, and airplanes, as well as vehicles or vehicular equipment for military, construction, farming, or recreational use. Vehicles can be customized or personalize via vehicle electronics. Vehicle electronics can include electronic systems used in vehicles. Vehicle electronics can include electronics for the drivetrain of a vehicle, the body or interior features of the vehicle, entertainment systems in the vehicle, and other parts of the vehicle. Ignition, engine, and transmission electronics can be found in vehicles with internal combustion powered machinery such as conventional cars, trucks, motorcycles, boats, planes, military vehicles, forklifts, tractors and excavators. Related elements for control of electrical vehicular systems are also found in hybrid and electric vehicles such as hybrid or electric automobiles. For example, electric cars can rely on power electronics for main propulsion motor control and managing the battery system.

In general, vehicle electronics can be distributed systems and can include a powertrain control module and powertrain electronics, a body control module and body electronics, interior electronics, and chassis electronics, safety and entertainment electronics, and electronics for passenger and driver comfort systems. Also, vehicle electronics can include electronics for vehicular automation. Such electronics can include or operate with mechatronics, artificial intelligence, and distributed systems. A vehicle using automation for complex tasks, including navigation, may be referred to as semi-autonomous. A vehicle relying solely on automation can be referred to as autonomous. Society of Automotive Engineers (SAE) has categorized autonomy into six levels. Level 0 or no automation. Level 1 or driver assistance, wherein the vehicle can control either steering or speed autonomously in specific circumstances to assist the driver. Level 2 or partial automation, wherein the vehicle can control both steering and speed autonomously in specific circumstances to assist the driver. Level 3 or conditional automation, wherein the vehicle can control both steering and speed autonomously under normal environmental conditions, but requires driver oversight. Level 4 or high automation, wherein the vehicle can complete a travel autonomously under normal environmental conditions, not requiring driver oversight. And, level 5 or full autonomy, wherein the vehicle can complete a travel autonomously in any environmental conditions.

A user profile is an electronic, digital, or computerize representation of a specific user. User profiles can be used by operating systems, computer programs, other types of computing systems, e-commerce and social media systems, as well as automotive infotainment systems. A mobile user profile is a type of user profile that can be used by at least a mobile device. A user profile can include a representation of a person's identity and can be considered a computer representation of a user model. A user model is data structure that can be used to capture certain characteristics about an individual user. And, the process of obtaining the user profile can be called user modeling or profiling. A user profile can also be used to store the description of characteristics of a person. The information of a user profile can be used by various types of systems such as any type of system considering characteristics and preferences of a person.

BRIEF DESCRIPTION OF THE DRAWINGS

The present disclosure will be understood more fully from the detailed description given below and from the accompanying drawings of various embodiments of the disclosure.

DETAILED DESCRIPTION

At least some embodiments disclosed herein relate to vehicles that can be customized and personalized via mobile user profiles. An example vehicle in some embodiments can include a body, a powertrain, vehicle electronics, and a computing system. The computing system of the vehicle can be configured to: receive data fields of a driver profile of a user from a mobile device; estimate, using machine learning, configurations of vehicle functions for the vehicle according to the data fields; and control settings of a set of components of the vehicle, via the vehicle electronics, according to the estimated configurations. The set of components of the vehicle can include components of the body, or the powertrain, or any combination thereof.

In some embodiments, the powertrain of a vehicle can be attached to a body and/or a chassis of the vehicle. The powertrain of the vehicle can include an engine, suspension and steering systems, and a final drive. The final drive can include at least one of wheels, a continuous track, propeller, a reaction-propulsion or electric-propulsion drive, or any combination thereof. The vehicle electronics of such a vehicle can include electronics for the body, or the powertrain, or any combination thereof.

At least some embodiments disclosed herein can be, include, or be a part of a networked system that includes mobile devices and vehicles and that is configured to implement customization and personalization of vehicles via mobile user profiles. Such a system can include a vehicle that includes at least a body, a powertrain, vehicle electronics, and a computing system. The system can also include a mobile device that includes at least a user interface and a computing system.

In some embodiments, the user interface (UI) of a mobile device can include any type of UI. And, the computing system of the mobile device can be configured to send, according to user input received via the UI, a plurality of data fields of a driver profile of a user to a computing system of a vehicle. The computing system of the mobile device can also be configured to estimate, using machine learning, a plurality of configurations of vehicle functions for the vehicle according to the plurality of data fields. The plurality of data fields can include settings of a plurality of components of another vehicle for the user. The computing system of the mobile device can also be configured to send the estimated plurality of configurations to the computing system of the vehicle to at least partially control settings of a set of components of the vehicle. The set of components of the vehicle can include components of a powertrain of the vehicle.

In some embodiments, a mobile device can store a user profile that contains configuration and preference information specific to a user. When the mobile device is securely connected to a vehicle, the user profile can be used to control the customization or personalization of the settings and/or the behavior of the vehicle such that any vehicle that is compatible with the technologies disclosed herein can be used by the user in a way that is like the way the user uses his or her own vehicle. In other words, compatible vehicles can be dynamically transformed to behave like a vehicle owned by the user.

It is easy for a vehicle to remember its last used configuration; however, it is more complex to port a configuration across different vehicles from different manufacturers. For example, if a seat is adjusted by a user in a first brand of vehicle and then the user adjusts a seat in a second brand of vehicle, an algorithm (such as a machine learning algorithm) can be used for the system to do a translation and estimation for determining the preferred seat configuration in the second brand of vehicle. Also, for example, it is easy for a vehicle to recall the last mode of driving used by a user (e.g., sport, mountain, normal, eco); but, porting such a preference and then translating that preference in another vehicle can be complex. Fortunately, such complexities can be mitigated by the systems and methods described herein.

Also, drive by wire is becoming more popular in vehicles. Thus, the relation between how much the user pushes or turns versus how much the vehicle steers, accelerates, or brakes can be adjustable, customizable, and personalizable. This allows a vehicle to be reconfigured to be driven in a way more like another vehicle. Drive by wire, steer-by-wire, fly-by-wire, or x-by-wire technology include the use of electrical or electro-mechanical systems for performing vehicle functions traditionally achieved by mechanical linkages. This technology replaces the traditional mechanical control systems with electronic control systems using electromechanical actuators and human-machine interfaces such as pedal and steering feel emulators. Components such as the steering column, intermediate shafts, pumps, hoses, belts, coolers and vacuum servos and master cylinders thus can be eliminated from the vehicle. Such technologies can be integrated with the systems and methods described herein.

Figure 1:
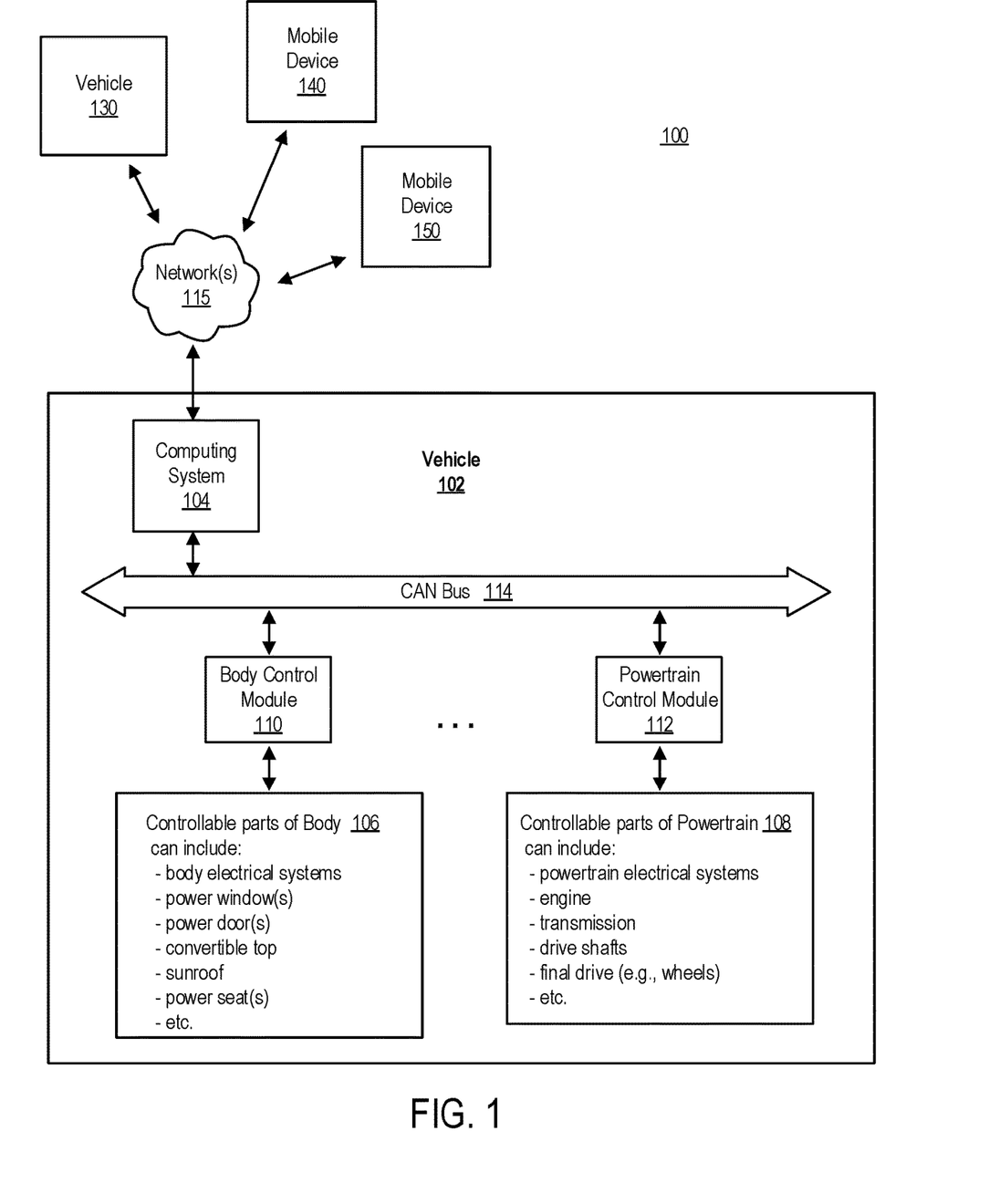
FIGS. 1 to 3 illustrate an example networked system that includes at least mobile devices and vehicles and that is configured to implement customization and personalization of vehicles via mobile user profiles, in accordance with some embodiments of the present disclosure.
Figure 2:
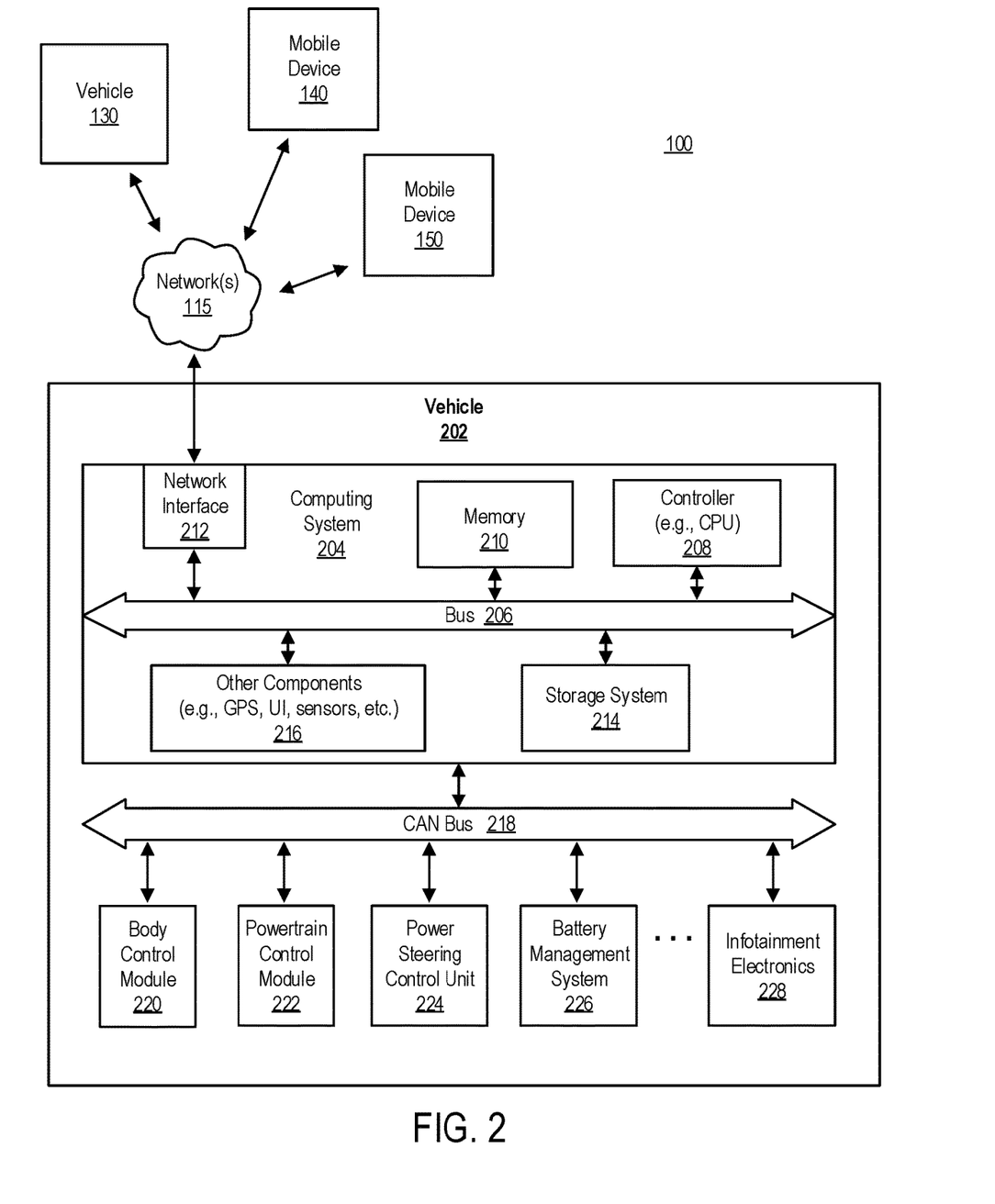
Figure 3:
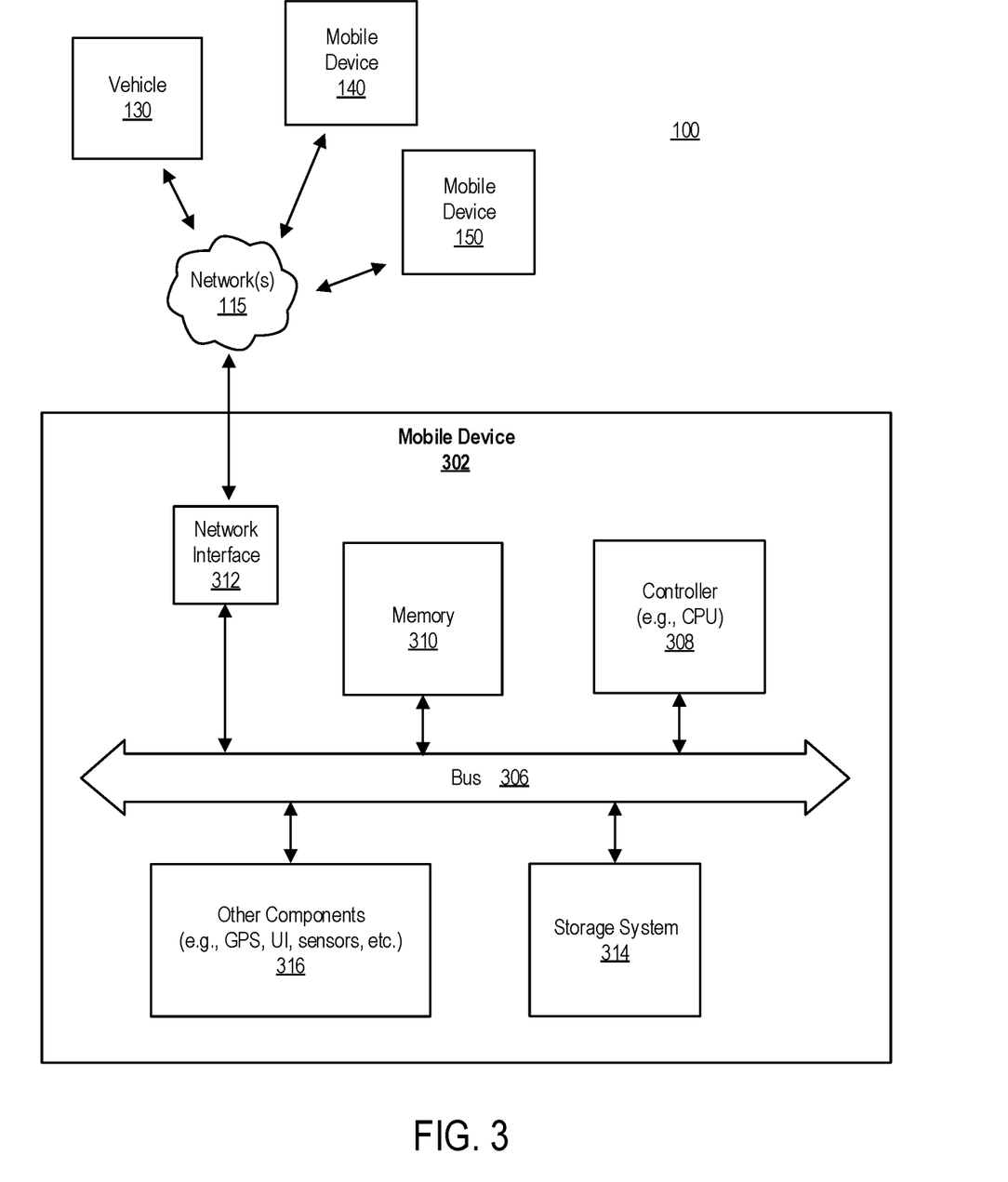

FIGS. 1 to 3 illustrate an example networked system 100 that includes at least mobile devices and vehicles (e.g., see mobile devices 140, 150, and 302 and vehicles 102, 202, and 130) and that is configured to implement customization and personalization of vehicles via mobile user profiles, in accordance with some embodiments of the present disclosure.

The networked system 100 is networked via one or more communications networks 115. Communication networks described herein, such as communications network(s) 115, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see mobile devices 140, 150, and 302 and vehicles 102, 202, and 130) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see vehicle computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the system 100 can include at least a vehicle 102 that includes a vehicle computing system 104, a body and controllable parts of the body 106, a powertrain and controllable parts of the powertrain 108, a body control module 110, a powertrain control module 112, and a controller area network (CAN bus) 114 that connects at least the vehicle computing system, the body control module, and the powertrain control module. Also, as shown, the vehicle 102 is connected to the network(s) 115 via the vehicle computing system 104. Also, shown, vehicle 130 and mobile devices 140 and 150 are connected to the network(s) 115. And, thus, are communicatively coupled to the vehicle 102.

The vehicle 102 includes vehicle electronics, including at least electronics for the controllable parts of the body 106 and the controllable parts of the powertrain 108. As shown, the vehicle 102 includes the controllable parts of the body 106 and such parts and subsystems being connected to the body control module 110. The body includes at least a frame to support the powertrain. A chassis of the vehicle can be attached to the frame of the vehicle. The body can also include an interior for at least one driver or passenger. The interior can include seats. The controllable parts of the body 106 can also include one or more power doors and/or one or more power windows. The body can also include any other known parts of a vehicle body. And, the controllable parts of the body 106 can also include a convertible top, sunroof, power seats, and/or any other type of controllable part of a body of a vehicle. The body control module 110 can control the controllable parts of the body 106.

Also, as shown, the vehicle 102 also includes the controllable parts of the powertrain 108. The controllable parts of the powertrain 108 and its parts and subsystems are shown being connected to the powertrain control module 112. The controllable parts of the powertrain 108 can include at least an engine, transmission, drive shafts, suspension and steering systems, a final drive, and powertrain electrical systems. The final drive can include at least one of wheels, a continuous track, propeller, a reaction-propulsion or electric-propulsion drive, or any combination thereof. The powertrain can also include any other known parts of a vehicle powertrain and the controllable parts of the powertrain 108 can include any other known controllable parts of a powertrain.

The computing system 104 can be configured to receive a plurality of data fields of a driver profile of a user from a mobile device (e.g., see mobile devices 140, 150, and 302). The user may be an owner of the vehicle 102. The computing system 104 can also be configured to estimate, using machine learning, a plurality of configurations of vehicle functions for the vehicle 102 according to the plurality of data fields. The plurality of data fields can include settings of a plurality of components of another vehicle for the user (e.g., see vehicle 130, which can be another vehicle used by the user or owned by the user). The computing system 104 can also be configured to control settings of a set of components of the vehicle 102, via the vehicle electronics (e.g., see body control module 110 and powertrain control module 112), according to the estimated plurality of configurations. The set of components of the vehicle 102 can include components of the controllable parts of the body 106, or the controllable parts of the powertrain 108, or any combination thereof.

In some embodiments, the computing system 104 can be configured to identify settings of the components of the vehicle 102. In such embodiments, the computing system 104 can also be configured to associate the identified settings to the driver profile of the user. The association can occur when the user selects to have the identified settings associated with the driver profile (such as from the mobile device of the user). The computing system 104 can also be configured to communicate the associated settings to the mobile device used by the user to update a version of the driver profile stored on the mobile device (e.g., see mobile devices 140, 150, and 302).

In some embodiments, the computing system 104 can include a central control module (CCM), central timing module (CTM), and/or general electronic module (GEM).

Also, in some embodiments, the vehicle can include an electronic control unit (ECU) is any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake Control Module, and battery management system.

As shown in FIG. 2, the system 100 can include at least a vehicle 202 that includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communications network(s) 115 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204. The computing system 204 can be communicatively coupled to the network(s) 115 as shown. The computing system 204 includes at least a bus 206, a controller 208 (such as a CPU), memory 210, a network interface 212, a data storage system 214, and other components 216 (which can be any type of components found in mobile or computing devices such as GPS components, I/O components such various types of user interface components, and sensors as well as a camera). The other components 216 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 206 communicatively couples the controller 208, the memory 210, the network interface 212, the data storage system 214 and the other components 216. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the computer system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 115).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 115 via the vehicle computing system 204. Also, shown, vehicle 130 and mobile devices 140 and 150 are connected to the network(s) 115. And, thus, are communicatively coupled to the vehicle 202.

As shown, the vehicle 202 includes vehicle electronics, including at least electronics for the body and the powertrain of the vehicle as well as for other components of the vehicle. It can be inferred from FIG. 2 that the vehicle 202 includes at least the body, the body's interior (which can have seats and other interior furnishings), the powertrain, the climate control system, the infotainment system since corresponding electronics are shown as being a part of the vehicle 202. The body of the vehicle 202 includes at least a frame to support the powertrain as well as body electrical systems. A chassis of the vehicle 202 can be attached to the frame of the vehicle. The interior can provide seating for at least one driver or passenger. In other words, the interior can include one or more seats. The body can also include one or more doors and/or one or more windows. The body can also include any other known parts of a vehicle body. Also, the powertrain can include any other known parts of a vehicle powertrain.

In some embodiments, the body of the vehicle 202 can include doors and windows and an interior of the body can include seating, a dashboard, or center console, or any combination thereof. The body and the interior can also include or the vehicle 202 can also include passenger and driver comfort systems having climate control systems, or seat adjustment systems, or any combination thereof. The body and the interior can also include or the vehicle 202 can also include information and entertainment systems (or an infotainment system which is a combination of information and entertainment systems). As shown, the vehicle electronics of vehicle 202 can include electronics for the interior, the passenger and driver comfort systems, and the information and entertainment systems. And, in such embodiments, the set of components of the vehicle can include components of the interior, the passenger and driver comfort systems, or the information and entertainment systems, or any combination thereof. And, since the computing system 204 can be similar to the system 104, it can also be configured to control settings of such a set of components of the vehicle 202, via the vehicle electronics, according to the estimated plurality of configurations (e.g., see vehicle body control module 220 of the body, powertrain control module 222 of the powertrain, power steering control unit 224, battery management system 226, and infotainment electronics 228 of the infotainment system).

In some embodiments, such as in vehicles 102 and 202, the powertrain can include a braking system, an exhaust system, a fuel supply system, or a transmission system, or any combination thereof.

In some embodiments, such as in vehicles 102 and 202, the computing system can include a memory, and the memory is configured to store the estimated plurality of configurations estimated by the computing system.

In some embodiments, such as in vehicles 102 and 202, a communication of the associated settings to the mobile device is over a secured and authenticated connection (such as a secured and authenticated connection over network(s) 115), and the driver profile can be communicated, by the mobile device to the computing system of the vehicle over a similar secured and authenticated connection.

In some embodiments, the computing system 204 can include a central control module (CCM), central timing module (CTM), and/or general electronic module (GEM).

Also, in some embodiments, the vehicle 202 can include an electronic control unit (ECU) is any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), or the like. Door control unit (DCU). Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake Control Module, and battery management system.

In some embodiments, the driver profile is associated with the user, the plurality of data fields is related to driver preferences of the user, and the driver preferences can include one or more groups of settings for vehicle components, each group of the group(s) of settings is for a specific vehicle product having a vehicle make and model. The driver preferences can also include a plurality of user-inputted preferences, each user-inputted preference of the plurality of user-inputted preferences is either a general vehicular preference, a preference related to a vehicle product, a preference related to a vehicle model, or a preference related to a vehicle brand. In such embodiments, each group of the group(s) of settings can include settings for a vehicle body, a powertrain, a chassis, vehicle electronics, a vehicle interior, passenger and driver comfort systems, or vehicle information and entertainment systems, or any combination thereof. In such embodiments, each group of the group(s) of settings can include automated driving configurations.

In such embodiments, the plurality of user-inputted preferences can include driving mode preferences of the user for at least one of a vehicle product, or a vehicle model, or any combination thereof. The driving mode preferences can include preferences for at least one of a performance mode, a fuel economy mode, a tow mode, an all-electric mode, a hybrid mode, an AWD mode, a FWD mode, a RWD mode, or a 4WD mode, or any combination thereof for at least one of a vehicle product, or a vehicle model, or any combination thereof.

As shown in FIG. 3, the system 100 can include at least a mobile device 302. The mobile device 302, which can have somewhat similar structure and/or functionality as the computing system 104 or 204, can be connected to communications network(s) 115. And, thus, be connected to vehicles 102, 202, and 130 as well as mobile devices 140 and 150.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, or digital camera, or any combination thereof. As shown, the mobile device 302 can be connected to communications network(s) 115 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 115 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such various types of user interface components, and sensors as well as a camera). The other components 316 can include one or more user interfaces (e.g., GUIs, auditory user interfaces, tactile user interfaces, etc.), displays, different types of sensors, tactile, audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 115). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 115).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 304. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Also, as shown in FIG. 3, the mobile device 302 can include a computing system (e.g., see the bus 306, controller 308, the memory 310, the network interface 312, and the storage system 314, which are all components of the computing system). The computing system can be configured to send, according to user input received via the user interface, a plurality of data fields of a driver profile of a user to a computing system of a vehicle. The computing system can also be configured to estimate, using machine learning, a plurality of configurations of vehicle functions for the vehicle according to the plurality of data fields. The plurality of data fields having settings of a plurality of components of another vehicle for the user. The computing system can also be configured to send the estimated plurality of configurations to the computing system of the vehicle to at least partially control settings of a set of components of the vehicle. The set of components of the vehicle having components of a powertrain of the vehicle.

In such an embodiment, computing system can also be configured to request the computing device of the vehicle to identify settings of the components of the vehicle as well as request the computing device of the vehicle to associate the identified settings to the driver profile of the user, when the user selects, via the user interface, to have the identified settings associated with the driver profile. The computing system can also be configured to receive the associated settings from the computing device of the vehicle, and update the driver profile stored in the mobile device according to the received associated settings.

Figure 4:
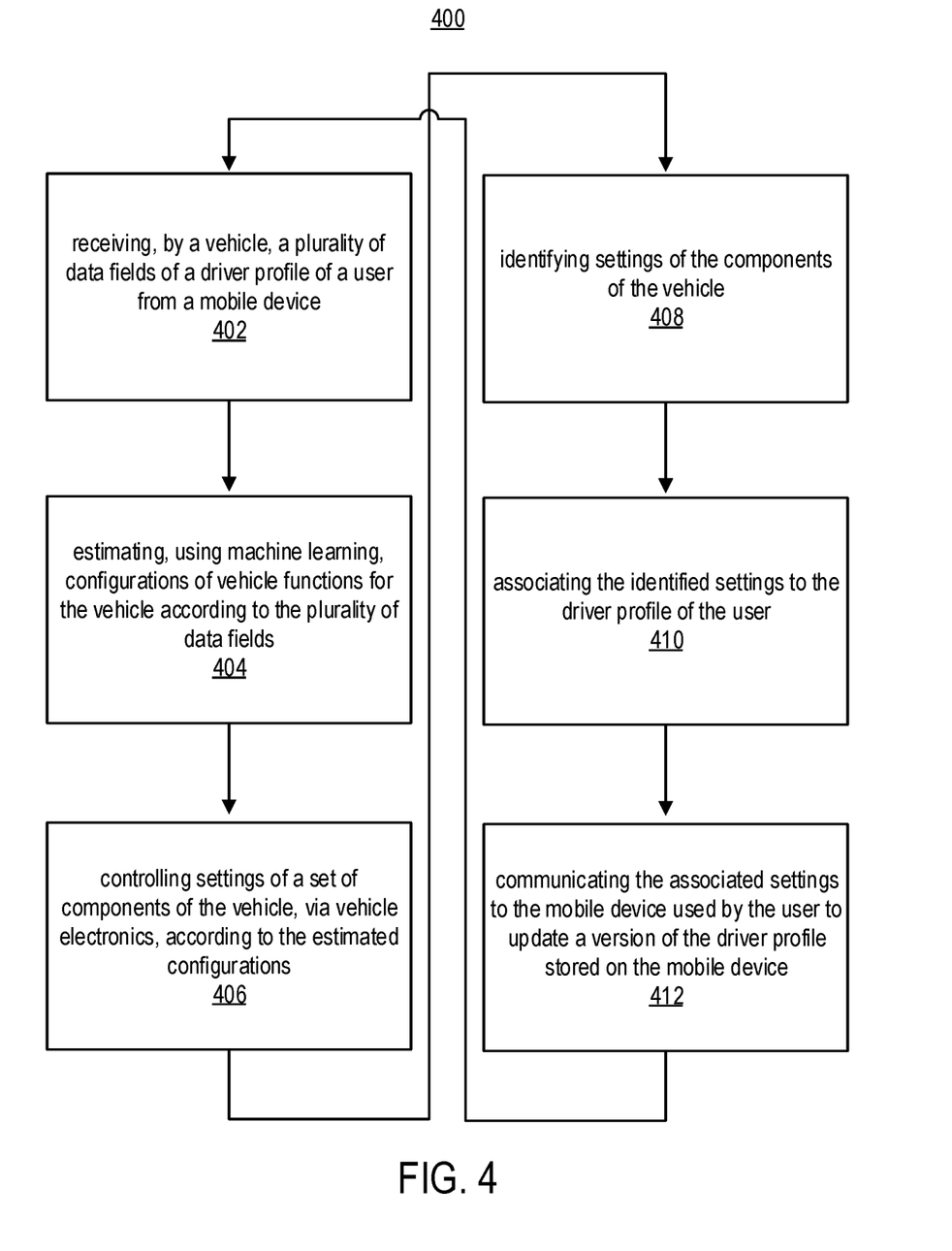
FIGS. 4 and 5 illustrate flow diagrams of example operations that can be performed by aspects of the networked system depicted in FIGS. 1 to 3, in accordance with some embodiments of the present disclosure.

FIG. 4 illustrates a flow diagram of example operations of method 400 that can be performed by aspects of the networked system depicted in FIGS. 1 to 3, in accordance with some embodiments of the present disclosure. For example, the method 400 can be performed by a computing system and/or other parts of any vehicle depicted in FIGS. 1 to 3.

In FIG. 4, the method 400 begins at step 402 with receiving, by a vehicle (e.g., see vehicle 102), a plurality of data fields of a driver profile of a user from a mobile device. For example, step 402 can include receiving, by a computing system of a vehicle (e.g., see computing systems 104 and 204), a plurality of data fields of a driver profile of a user from a mobile device (e.g., see mobile devices 140, 150, and 302).

At step 404, the method 400 continues with estimating, using machine learning, configurations of vehicle functions for the vehicle according to the plurality of data fields. For example, step 404 can include estimating, by the computing system, using machine learning, a plurality of configurations of vehicle functions for the vehicle according to the plurality of data fields. The plurality of data fields can include settings of a plurality of components of another vehicle for the user (e.g., see vehicle 130 or vehicle 202) and/or the vehicle for the user (e.g., see vehicle 102).

At step 404, the estimating of the plurality of configurations of vehicle functions can at least be partially according to an artificial neural network (ANN). In such embodiments, the estimating can include processing the plurality of data fields of the driver profile as input data according to a set of neurons of the ANN to generate output data. And, the estimating can include deriving the plurality of configurations of vehicle functions according to the generated output data. Besides use of an ANN, other machine learning and artificial intelligence techniques can be used in the estimating of the plurality of configurations of vehicle functions. For example, different machine learning models and training models can be used (such as federated training). For example, the estimations can include the use of one or more of ANNs, decision trees, support vector machines, Bayesian networks, and/or genetic algorithms. Also, different approaches of machine learning can be used in the estimations, such as supervised learning, unsupervised learning, reinforcement learning, self learning, feature learning, sparse dictionary learning, anomaly detection, and association rules can be used.

At step 406, the method 400 continues with controlling settings of a set of components of the vehicle, via vehicle electronics, according to the estimated configurations. For example, step 406 can include controlling, by the computing system, settings of a set of components of the vehicle, via vehicle electronics of the vehicle (e.g., see body control module 110 and powertrain control module 112), according to the estimated plurality of configurations. The set of components of the vehicle can include components of a powertrain of the vehicle and/or other components of the vehicle such as body components (e.g., frame and interior components, doors and door parts, windows and window parts, etc.), climate control components and other comfort components, safety components, and infotainment components.

The powertrain components can include couplings to the chassis, engine components, suspension and steering components, the final drive, and powertrain electrical systems. With vehicles having internal combustion powered machinery, the powertrain components can include ignition, engine and transmission components. The powertrain components can also include related components for control of electrical systems which can be found in hybrid and electric vehicles such as hybrid or electric automobiles. For example, the powertrain components can include power electronics for the main propulsion motor control as well as managing the battery system. And, the powertrain components can include electronics for propulsion and control of autonomous cars and vehicles. In some embodiments, powertrain and its components can include an engine, suspension and steering systems, and a final drive. The final drive can include at least one of wheels, a continuous track, propeller, a reaction-propulsion or electric-propulsion drive, or any combination thereof. And, in such embodiments and others, the vehicle electronics can include electronics for the powertrain.

At step 408, the method 400 continues with identifying settings of the components of the vehicle. For example, step 408 can include identifying, by the computing system, settings of the components of the vehicle. The step 408 can occur after a request is received from a user to identify the settings (e.g., see step 508 depicted in FIG. 5).

At step 410, the method 400 continues with associating the identified settings to the driver profile of the user. For example, step 410 can include associating, by the computing system, the identified settings to the driver profile of the user. The step 410 can occur after receiving a request from a user to associate the identified settings with the user profile (e.g., see step 510 depicted in FIG. 5). For example, step 410 can occur when the user selects to have the identified settings associated with the driver profile.

At step 412, the method 400 continues with communicating the associated settings to the mobile device used by the user to update a version of the driver profile (such as a version of the driver profile stored on the mobile device). For example, step 410 can include communicating, by the computing system, the associated settings to the mobile device used by the user to update a version of the driver profile stored on the mobile device. The communicating of the associated settings to the mobile device can be over a secured and authenticated connection. Also, in such embodiments and others, the driver profile can be communicated, by the mobile device to the computing system of the vehicle over a similar secured and authenticated connection.

Figure 5:
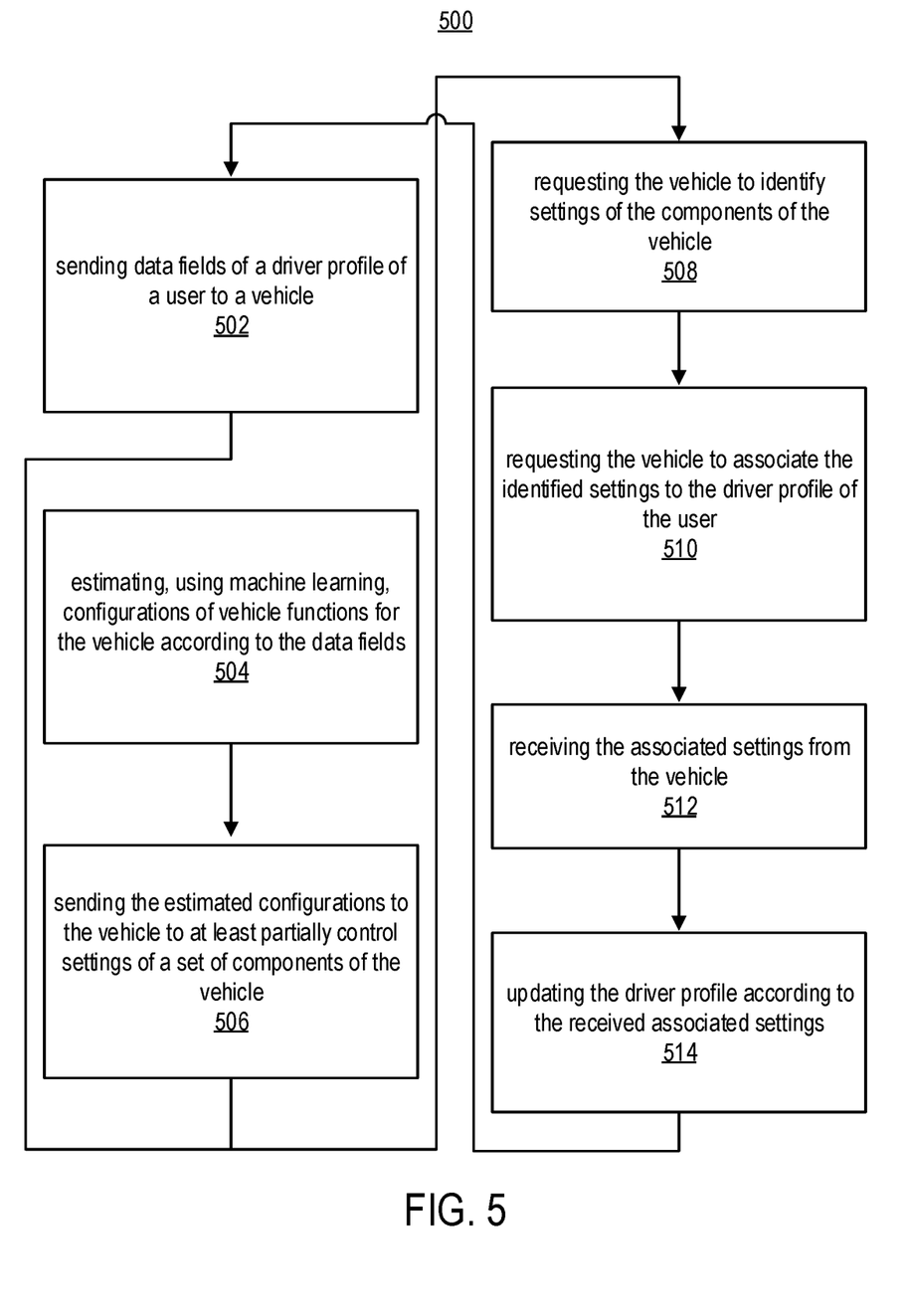

In some embodiments, including the embodiments described with respect to method 400 as well as method 500, the driver profile can be associated with the user and the plurality of data fields can be related to driver preferences of the user. The driver preferences can include one or more groups of settings for vehicle components. Each group of the group(s) of settings can be for a specific vehicle product having a vehicle make and model. Also, the driver preferences can include a plurality of user-inputted preferences. Each user-inputted preference of the plurality of user-inputted preferences can be either a general vehicular preference, a preference related to a vehicle product, a preference related to a vehicle model, or a preference related to a vehicle brand.

Also, each group of the group(s) of settings can include settings for a vehicle body, a powertrain, a chassis, vehicle electronics, a vehicle interior, passenger and driver comfort systems, or vehicle information and entertainment systems, or any combination thereof. And, each group of the group(s) of settings can include automated driving configurations. For example, each group of the group(s) of settings can include settings for configurations and preferences related to the various levels of automation according to the SAE. Each group of the group(s) of settings can include settings for: no automation preferences or configurations (level 0), driver assistance preferences or configurations (level 1), partial automation preferences or configurations (level 2), conditional automation preferences or configurations (level 3), high automation preferences or configurations (level 4), or full preferences or configurations (level 5).

In some embodiments, it is to be understood that steps 402 to 412 can be implemented as a continuous process such as each step can run independently by monitoring input data, performing operations and outputting data to the subsequent step. Also, steps 402 to 412 can be implemented as discrete-event processes such as each step can be triggered on the events it is supposed to trigger and produce a certain output. It is to be also understood that FIG. 4 represents a minimal method within a possibly larger method of a computer system more complex than the ones presented partly in FIGS. 1 to 3. Thus, the steps depicted in FIG. 4 can be combined with other steps feeding in from and out to other steps associated with a larger method of a more complex system.

FIG. 5 illustrates a flow diagram of example operations of method 500 that can be performed by aspects of the networked system depicted in FIGS. 1 to 3, in accordance with some embodiments of the present disclosure. For example, the method 500 can be performed by any mobile device depicted in FIGS. 1 to 3. Also, the method 500 can be performed by another type of computing device such as an IoT device, smart television, smart watch, glasses or other smart household appliance, in-vehicle information system, wearable smart device, game console, PC, or digital camera, or any combination thereof.

In FIG. 5, the method 500 begins at step 502 with sending, by a computing device (e.g., see mobile devices 140, 150, and 302), data fields of a driver profile of a user to a vehicle. The sending of data fields at step 502 can be according to user input received via a UI of a mobile device. For example, the step 502 can include sending by a mobile device (e.g., see mobile devices 140, 150, and 302), according to user input received via a UI of the mobile device, a plurality of data fields of a driver profile of a user to a computing system of a vehicle (e.g., see vehicle 102).

At step 504, the method 500 continues with estimating by the computing device, using machine learning, configurations of vehicle functions for the vehicle according to the plurality of data fields. The plurality of data fields can include settings of a plurality of components of another vehicle for the user (e.g., see vehicle 130 or vehicle 202) and/or the vehicle for the user (e.g., see vehicle 102).

At step 504, the estimating of the plurality of configurations of vehicle functions can at least be partially according to an artificial neural network (ANN). In such embodiments, the estimating can include processing the plurality of data fields of the driver profile as input data according to a set of neurons of the ANN to generate output data. And, the estimating can include deriving the plurality of configurations of vehicle functions according to the generated output data. Besides use of an ANN, other machine learning and artificial intelligence techniques can be used in the estimating of the plurality of configurations of vehicle functions. For example, different machine learning models and training models can be used (such as federated training). For example, the estimations can include the use of one or more of ANNs, decision trees, support vector machines, Bayesian networks, and/or genetic algorithms. Also, different approaches of machine learning can be used in the estimations, such as supervised learning, unsupervised learning, reinforcement learning, self learning, feature learning, sparse dictionary learning, anomaly detection, and association rules can be used.

At step 506, the method 500 continues with sending, by the computing device, the estimated plurality of configurations to the computing system of the vehicle to at least partially control settings of a set of components of the vehicle. The set of components of the vehicle can include components of a powertrain of the vehicle and/or other components of the vehicle such as body components (e.g., frame and interior components, doors and door parts, windows and window parts, etc.), climate control components and other comfort components, safety components, and infotainment components.

At step 508, the method 500 continues with requesting, by the computing device, the vehicle to identify settings of the components of the vehicle. For example, the step 508 can include requesting, by the computing device, the computing device of the vehicle to identify settings of the components of the vehicle. This can occur after the user selects for the identification of the settings via a UI of the computing device.

At step 510, the method 500 continues with requesting, by the computing device, the vehicle to associate the identified settings to the driver profile of the user. The step 510 can occur when the user selects, via the user interface, to have the identified settings associated with the driver profile. For example, the step 510 can include requesting, by the computing device, the computing device of the vehicle to associate the identified settings to the driver profile of the user, when the user selects, via the user interface, to have the identified settings associated with the driver profile.

At step 512, the method 500 continues with receiving, by the computing device, the associated settings from the vehicle. For example, the step 512 includes receiving, by the computing device, the associated settings from the computing device of the vehicle. And, at step 514, the method 500 continues with updating, by the computing device, the driver profile according to the received associated settings. For example, the step 514 includes updating, by the computing device, the driver profile stored in the computing device (e.g., the mobile device) according to the received associated settings.

In some embodiments, it is to be understood that steps 502 to 514 can be implemented as a continuous process such as each step can run independently by monitoring input data, performing operations and outputting data to the subsequent step. Also, steps 502 to 514 can be implemented as discrete-event processes such as each step can be triggered on the events it is supposed to trigger and produce a certain output. It is to be also understood that FIG. 5 represents a minimal method within a possibly larger method of a computer system more complex than the ones presented partly in FIGS. 1 to 3. Thus, the steps depicted in FIG. 5 can be combined with other steps feeding in from and out to other steps associated with a larger method of a more complex system.

In some embodiments, a mobile device can store a user profile that contains configuration and preference information specific to a user of the mobile device. The user profile can include configuration and preference information specific to one or more vehicles as well. Upon a secure and/or authenticated connection to one or more computing devices of a vehicle (e.g., based on exchanging a security key), a mobile device can communicate user profile information to the one or more computing devices of the vehicle. This allows a mobile device to configure vehicle settings as long as the vehicle has one or more computing devices compatible with an application that transfers the user profile information from the mobile device to the computing device(s) of the vehicle. In other words, in such examples, the user profile is used to control the customization of settings and/or the behavior of a compatible vehicle so that the vehicle can be adjusted to behave or perform in a customized way for the user.

The vehicular user profile information can be generated manually via a UI in which the user enters configurations/preferences for one or more vehicles, and/or the vehicular user profile information can be generated automatically via sensors of the mobile device, feedback from automotive electronics or the computing device(s) of vehicle(s), or from user profile information related to vehicle preference and configuration information that was gathered from other sources such as from Internet browsing, preferences shown in social media, etc. For example, a user that shows interest in sports cars online may have a vehicular user profile having a preference for a sports driving mode or performance driving mode in general. On the other hand, a user that shows an interest online in fuel economy or saving money in general may have a vehicular user profile having a preference for a fuel-economy mode. Also, for example, a user that keeps their passenger environment at approximately 70 degrees Fahrenheit may have a profile showing a preference for 70 degrees. The preference for 70 degrees could also come from a non-vehicular source such as an HVAC controller in the user's home. As imagined, the configurations/preferences are endless and the ways of generating the configurations/preferences are endless as well.

The configuration and preference information can pertain to adjustments of the vehicle via automotive electronics (such as adjustments in the transmission, engine, chassis, passenger environment, safety features, etc. via respective automotive electronics). The configuration and preference information can also pertain to automated driving configurations and preferences. The configuration and preference information can pertain to the various levels of automation according to the SAE. Such information can pertain to no automation preferences or configurations (level 0), driver assistance preferences or configurations (level 1), partial automation preferences or configurations (level 2), conditional automation preferences or configurations (level 3), high automation preferences or configurations (level 4), or full preferences or configurations (level 5).

Preference information can include driving mode preferences such as sports or performance mode, fuel economy mode, tow mode, all-electric mode, hybrid mode, AWD mode, FWD mode, RWD mode, 4WD mode, etc. The modes can be specific or general. For example, user prefers specific sports mode of a specific automaker. Or, for example, user prefers fuel economy modes in general over performance modes or sports modes.

On the other hand, configuration information can include specific transmission configurations, engine configurations, chassis configurations, for the user for one or more vehicles. The configuration information can be based on the preference information. And the configuration information can adjust parts of the vehicle via respective electronics for the parts.

The preferences/configurations from the user profile can also relate to preferences/configurations of in-car entertainment systems, automotive navigation systems, passenger conform systems, electronic integrated cockpit systems, etc.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   at least one processing device configured on a first vehicle; and
   memory containing instructions configured to instruct the at least one processing device to:
   receive, from a mobile device of a user, signaling indicative of settings for components of the first vehicle; wherein at least a portion of the settings for the components of the first vehicle is from user entered data or sensor generated data from the first vehicle and at least a portion of the settings for the components of the first vehicle is an output from first vehicle machine-learning processing using input comprising at least one data field corresponding to a setting for a component of the first vehicle and at least one data field corresponding to a setting for a component of another vehicle; wherein the mobile device is configured to store, in data fields of a mobile user profile, the settings for the components of the first vehicle received from the first vehicle; wherein the signaling indicative of the settings for the components of the first vehicle comprising input to the first vehicle machine-learning processing comprises internet browsing history or social media preferences of the user indicating:
   whether the user has online activities related to sports cars in the internet browsing history or the social media preferences of the user;
   whether the user has online activities related to fuel economy in the internet browsing history or the social media preferences of the user; and
   wherein the settings for the components of the first vehicle comprises a preferred driving mode, in a range between:
   a sports or performance driving mode; and
   a fuel economy mode; and wherein the preferred driving mode is determined based at least in part on online activities of the user related to sports cars and fuel economy in the internet browsing history or social media preferences;
   determine, based on the received signaling, new settings using second vehicle machine-learning processing, wherein the settings for the components of the first vehicle comprise inputs to the second vehicle machine-learning processing, and the new settings correspond to an output from the second vehicle machine-learning processing; and
   provide the new settings to the mobile device to cause the mobile device to store the new settings in the mobile user profile configured in the mobile device;
   wherein in response to the mobile device being securely connected to a second vehicle, the mobile user profile stored in the mobile device is to configure, based on the new settings, components of the second vehicle to dynamically transform the second vehicle to behave according to the preferred driving mode.

2. The system of claim 1, wherein the instructions are further configured to, when executed in the second vehicle, instruct at least one processing device to:
   save additional data that indicates settings of the second vehicle; and
   send, to the mobile device, signaling indicative of the additional data for updating the mobile user profile configured on the mobile device.

3. The system of claim 2, wherein the second vehicle is configured to securely connect to the mobile device via exchanging a security key with the mobile device, prior to sending the signaling indicative of the additional data.

4. The system of claim 1, wherein the data fields comprise settings for a dashboard or center console of the first vehicle, and the output from the second vehicle machine-learning processing comprises settings for a dashboard or center console of the second vehicle.

5. The system of claim 1, wherein the data fields comprise historical data for brake settings of a braking system of the first vehicle, and the output from the second vehicle machine-learning processing comprises settings for a braking system of the second vehicle that are determined based on the historical data.

6. The system of claim 1, wherein the data fields further correspond to settings for a third vehicle and wherein the settings for the components of the first vehicle comprise settings for the user when using the first vehicle as a driver; and the settings for the third vehicle comprise settings for the user when using the third vehicle as a passenger.

7. The system of claim 6, wherein the third vehicle is an autonomous vehicle, and the settings for the third vehicle comprise an automated driving configuration requested by the user.

8. A method comprising:
configuring, in response to a mobile device of a user being securely connected to a first vehicle, components of the first vehicle to dynamically transform the vehicle to behave according to a preferred driving mode identified via a mobile user profile configured in the mobile device, via:
receiving, from the mobile device of the user and by a computing system of the first vehicle, signaling indicative of settings for components of a second vehicle; wherein the mobile device is configured to store, in data fields of the mobile user profile, the settings for the components of the second vehicle received from the second vehicle; wherein at least a portion of the settings for the components of the second vehicle is from user entered data or sensor generated data from the second vehicle and at least a portion of the settings of the components for the second vehicle is an output from machine-learning processing using input comprising at least one data field corresponding to a setting for a component of the second vehicle and at least one data field corresponding to a setting for a component of another vehicle; wherein the signaling indicative of the settings for the components of the second vehicle comprising input to the machine-learning processing comprises internet browsing history or social media preferences of the user indicating:
whether the user has online activities related to sports cars in the internet browsing history or the social media preferences of the user;
whether the user has online activities related to fuel economy in the internet browsing history or the social media preferences of the user; and
wherein the settings for the components of the second vehicle comprises the preferred driving mode, in a range between:
a sports or performance driving mode; and
a fuel economy mode; and wherein the preferred driving mode is determined based at least in part on online activities of the user related to sports cars and fuel economy in the internet browsing history or social media preferences;
estimating, based on the received signaling, a configuration of vehicle functions for the first vehicle, wherein the settings for components of the second vehicle comprise an input to first vehicle machine-learning processing, and the configuration corresponds to an output from the first vehicle machine-learning processing; and
controlling, by the computing system based on the configuration, the components of the first vehicle to dynamically transform the first vehicle to behave according to the preferred driving mode.

9. The method of claim 8, comprising:
saving, by the computing system, the configuration of settings for the components of the first vehicle; and
sending, by the computing system to the mobile device, signaling indicative of data regarding the configuration of settings for the components of the first vehicle for updating a user profile on the mobile device.

10. The method of claim 8, wherein the first vehicle machine-learning processing is achieved using an artificial neural network (ANN), and the estimating comprises:
processing data fields as input data according to the ANN to generate output data; and
deriving the configuration of settings of the components of the first vehicle according to the generated output data.

11. The method of claim 8, wherein the components of the first vehicle comprise at least one of an engine, a suspension system, a steering system, or a final drive.

12. The method of claim 8, wherein the mobile user profile comprises data fields related to component settings for a first type of vehicle, and the first vehicle is a second type of vehicle.

13. A system comprising:
a mobile device, having:
a display configured to present a user interface to a user;
at least one processing device; and
memory containing instructions configured to instruct the at least one processing device to:
select, according to user input received via the user interface, data fields of a mobile user profile configured in the mobile device and corresponding to a first vehicle, the data fields comprising settings for components of a second vehicle, the settings for the components of the second vehicle being received from the second vehicle and stored in the mobile device; wherein at least a portion of the settings for the components of the second vehicle is from user entered data or sensor generated data from the second vehicle and at least a portion of the settings for the components of the second vehicle is an output from machine-learning processing using input comprising at least one data field corresponding to a setting for a component of the second vehicle and at least one data field corresponding to a setting for a component of another vehicle; wherein the data fields for the settings for the components of the second vehicle comprising input to the machine-learning processing comprises internet browsing history or social media preferences of the user indicating:
whether the user has online activities related to sports cars in the internet browsing history or the social media preferences of the user;
whether the user has online activities related to fuel economy in the internet browsing history or the social media preferences of the user; and
wherein the settings for the components of the second vehicle comprises a preferred driving mode, in a range between:
a sports driving mode;
a performance driving mode; and
a fuel economy mode; and wherein the preferred driving mode is determined based at least in part on online activities of the user related to sports cars and fuel economy in the internet browsing history or social media preferences;

estimate a configuration for vehicle functions of the first vehicle, wherein the data fields associated with the second vehicle comprise input to first vehicle machine-learning processing, and the configuration corresponds to an output of first vehicle machine-learning processing; and send, to the first vehicle, signaling indicative of the configuration, wherein the first vehicle is configured to, based on the configuration, control settings of components of the first vehicle.

14. The system of claim 13, wherein the instructions are further configured to instruct the at least one processing device to:

store the mobile user profile, corresponding to the data fields, in memory or a storage device;

send, to the first vehicle, a request for data regarding settings used by the components of the first vehicle;

receive, from the first vehicle, signaling indicative of the data regarding the settings; and update, based on the data regarding the settings, the mobile user profile.

* * * * *